UNITED STATES PATENT OFFICE.

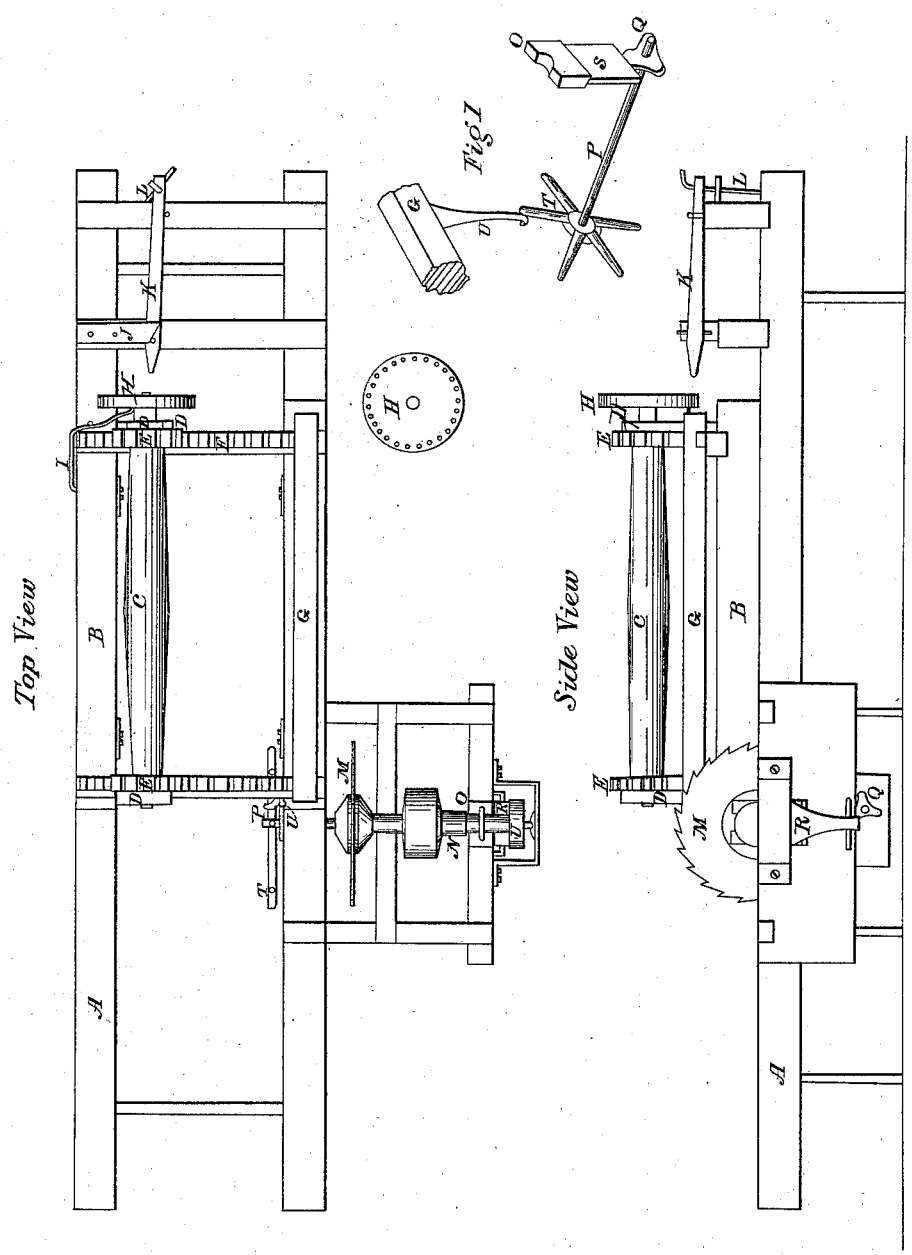

DANIEL NEWTON, OF DALTON, NEW HAMPSHIRE.

MACHINE FOR SAWING CLAPBOARDS.

Specification of Letters Patent No. 3,179, dated July 20, 1843.

*To all whom it may concern:*

Be it known that I, DANIEL NEWTON, of Dalton, in the county of Coos and State of New Hampshire, have invented a new and useful Improvement in the construction of a Clapboard Machine; and I do hereby declare that the following is a full and exact description of the same.

The improvement which I claim as my invention is for sawing clapboards from plank, about 6 inches thick, and the machine may be made of any dimensions to suit the owner; and it will not be necessary to describe the whole machine, but the parts which I claim; these are two; first is the apparatus for setting the plank, or moving it forward toward the saw; this is done in the following manner viz. At each end of the carriage B near the side opposite the saw is attached one post, and on which hangs a shaft C 4 or 5 inches in diameter and at each end of this shaft on the inside of the posts, D, is a cast iron wheel E which mesh into gages F, which gages are fastened to the headblock G, to which the plank is fastened for sawing. On the forward end of the shaft C, is a cast iron wheel H with one or more circles of holes in it, and a spring I on the cross piece of the carriage with a knob on one end of it to fit in the holes of the wheel H. At the forward end of the machine, and in a stationary manner is fastened a piece of cast iron $j$ with a groove in it, which is cut off on a slant. In this groove is a piece of iron or steel K with a pin through it to move on the slant and hung on a spring L at the other end. When the carriage runs back the iron K enters one of the holes and moving on the slant turns the wheel H to the next hole, when the spring I which was pressed out by K again enters the next hole, and holds it firm until the like operation is again produced, and thus the process for moving forward the plank is finished.

My 2d improvement is the hanging of the arbor N for a circular saw M in such a position that one end of it can be raised or lowered alternately for sawing thick and thin edges of the clapboards, and the process I use is the following. I hang the arbor N in boxes, which boxes hang on horns for the purpose of allowing them to cant with the arbor, to keep a regular bearing in the box. The box for the end of the arbor, from the saw, hangs on a piece of wood, which has a mortise through the saw frame to receive it, and a piece of steel S see figure on the lower end resting on the 3 cogged wheel, which wheel is on a shaft of iron, and a wheel with six arms T on the other end of the shaft. There is a piece of wood V attached to the carriage which comes against one of the arms of T every time the carriage runs back and turns the wheel one sixth of the way around thus raising and lowering the arbor alternately. Against the end of the arbor opposite to the saw is a flat bar of iron X with a projection of steel on it about $\frac{1}{4}$th of an inch thick which when the arbor falls moves it in end toward the flank. In the sliding box O, S, is a projection the same as the former one which bears against a 3d projection on a piece astride the arbor, so that when the arbor rises these projections draw it back from the plank which is sawing the same distance it was moved toward the plank when it was lowered thus regulating the thickness of the clapboards. The process of moving the arbor in end is to avoid making one clapboard thicker than the other and thus the operation is complete.

What I claim as my invention and desire to secure by Letters Patent is—

The hanging the shaft of the saw so that one end of it can be raised or lowered in combination with the cam Q and sliding box O, S for the purpose and in the manner described. And I also claim the method of regulating the set of the log on plank, by means of the index wheel H, on the shaft G, of the wheel E F that move the carriage, in combination with the sliding steel pin K and inclined surface $j$ substantially as herein described.

DANIEL NEWTON.

Witnesses:
GEO. A. COSSITT,
BAKER DODGE.